(No Model.)
S. G. BROSIUS.
ROTARY ENGINE.
No. 453,615.  Patented June 9, 1891.
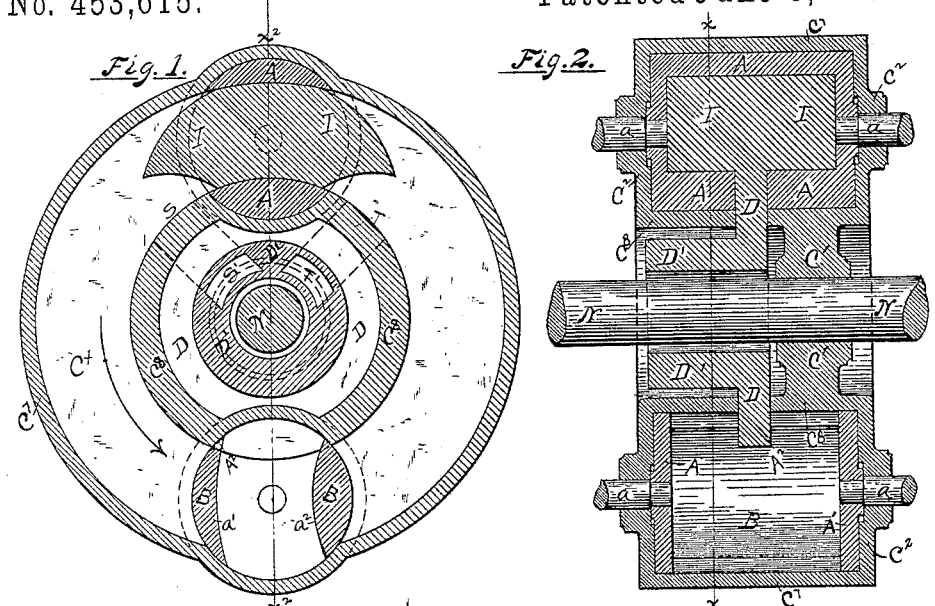
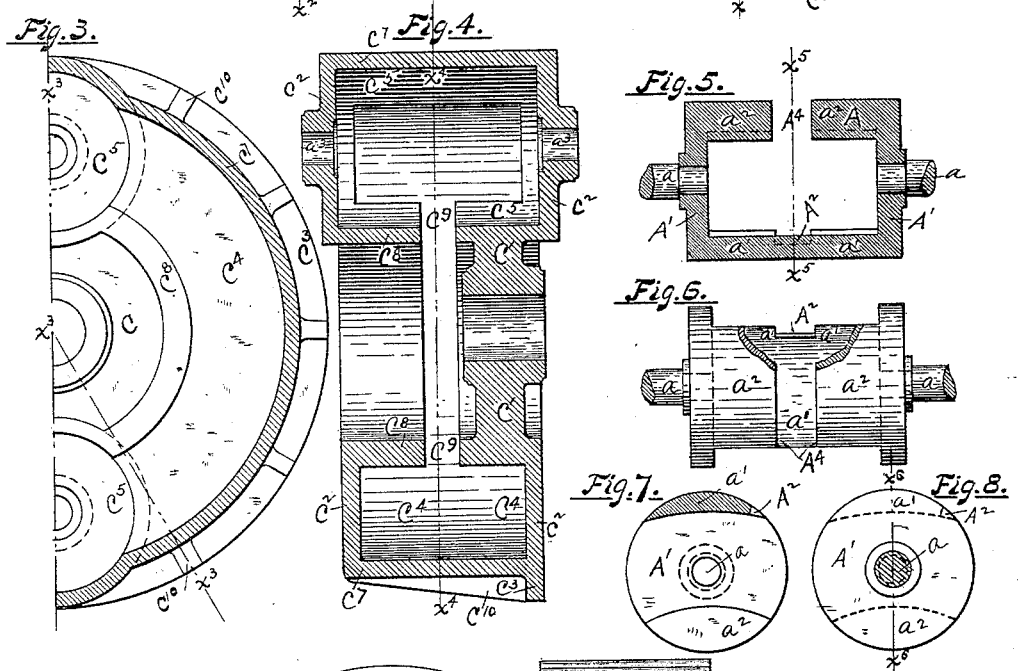
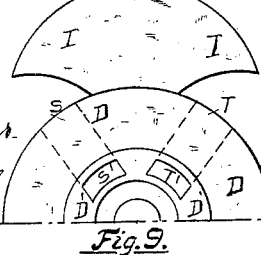
Fig. 9.
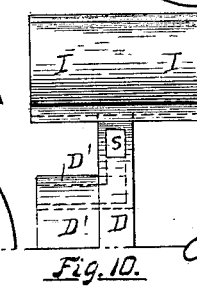
Fig. 10.
WITNESS:
J. Henry Kaiser
Joseph E. Stack
INVENTOR
S. G. Brosius
BY
J. Stuart Rusk
ATTORNEY.
THE NORRIS PETERS CO., PHOTO-LITHO., WASHINGTON, D. C.

UNITED STATES PATENT OFFICE.

SAMUEL GLENVILLE BROSIUS, OF SAVANNAH, GEORGIA.

ROTARY ENGINE.

SPECIFICATION forming part of Letters Patent No. 453,615, dated June 9, 1891.

Application filed April 30, 1891. Serial No. 391,099. (No model.)

*To all whom it may concern:*

Be it known that I, SAMUEL GLENVILLE BROSIUS, of Savannah, in the county of Chatham and State of Georgia, have invented a new and useful Improvement in Rotary Engines, of which the following, taken in connection with the accompanying drawings, is a specification.

The invention has for its objects, first, to reduce friction between the parts; second, to make the pistons rigid by supporting them at both ends; third, to seat the pistons so as to avoid friction from end packing by having the heads of the cylinder revolve with the rotating cylinder; fourth, to reduce the number of steam-joints necessary to be packed, thereby reducing the friction. These and other objects are accomplished by the mechanism hereinafter described.

The invention consists of certain novel features of construction hereinafter described, and pointed out in the claims.

In the drawings, Figure 1 is a vertical section on the line $x\ x$ of Fig. 2 through the rotating cylinder, the stationary abutment-disk, abutments, and the pistons. Fig. 2 is a vertical central section on line $x^2\ x^2$ of Fig. 1 through the rotating cylinder, the stationary abutment-disk, abutments, and the piston. Fig. 3 is a vertical section on the line $x^4\ x^4$ of Fig. 4 through the rotating cylinder. Fig. 4 is a cross-section on the line $x^3\ x^3$ of Fig. 3 through the rotating cylinder. Fig. 5 is a vertical section on the line $x^6\ x^6$ of Fig. 8 through the piston. Fig. 6 is an elevation of the piston, part of one wing being broken away to show the groove in the other wing. Fig. 7 is a cross-section on the line $x^5\ x^5$ of Fig. 5 through the piston. Fig. 8 is an end view of the piston. Fig. 9 is a side elevation above the horizontal center line of the stationary abutment-disk, showing abutments and steam and exhaust ports. Fig. 10 is an end view above the horizontal center line of the stationary abutment-disk, showing abutments and steam and exhaust ports.

Like letters of reference refer to like parts throughout the several views.

The cylinder C is formed by the outer and inner rings $C^7$ and $C^8$ and heads $C^2$, forming the annular cavity $C^4$. Said cylinder is mounted on the shaft N and rotates with it by means of the hub $C'$, attached to the inner periphery of ring $C^8$. The heads $C^2$ are attached to the rings $C^7$ and $C^8$ and revolve with them, thus avoiding friction which is produced when the rings are mounted and revolve on stationary heads. The inner ring $C^8$ is provided with an annular groove $C^9$, which receives the abutment-disk D, which is packed steam-tight within the said annular groove of the cylinder. Said disk is held stationary by the hub $D'$. In the rings $C^7$ and $C^8$ there are provided piston-seats $C^5$ to receive the pistons, and the journal-boxes $a^3$ are provided in heads $C^2$ to receive the crank-shafts $a$ on each end of the piston by which they may be controlled. The flange $C^3$ and ribs $C^{10}$ are provided to strengthen and stiffen the outer ring $C^7$.

The location of the groove $C^9$ in the ring $C^8$ is not material, the only requirement being that the groove must be so placed as not to interfere with mounting the rotary cylinder C upon the shaft N—that is, the location of the groove $C^9$ is not confined to the center of ring $C^8$, as shown.

The piston A is formed of the disks $A'$ and the wings $a'\ a^2$, the inner wing $a^2$ being provided with the opening $A^4$, which allows the piston to revolve around the abutment-disk D, which is packed in said opening $A^4$, while the piston-wing $a'$ is in contact with it. The outer wing $a'$ of the piston is provided with the groove $A^2$, in which is packed the outer periphery of the abutment-disk D, when it is in contact with the said wing $a'$ during the portion of the revolution of said piston A about the axis of the rotating cylinder C, excepting when the said piston A is oscillating to pass the abutments I.

In case it is desired to have the abutment-disk D extend into the outer ring $C^7$, the cavities $A^2$ and $A^4$ would be respectively reversed in the respective rings $C^7$ and $C^8$ of the piston A.

The abutment-disk D is provided with the abutments I, which extend into the cavity $C^4$ of the rotating cylinder. Said disk is also provided with steam inlets and exhaust ports S and T, respectively. The steam is admitted and exhausted through said ports and their respective pipes S' and T'. The steam, having entered at port S, acts on piston B and propels the cylinder in the direction indicated by the arrow. The steam is exhausted at port T. The piston A passes the abutments I and the port S. The steam from said port S acts on the said piston A in a like manner and keeps up the rotation of the cylinder. The piston B, its disks, crank-shafts, and wings are identical to the piston A and its respective parts.

I do not confine myself to the construction shown, as the same may be varied without departing from the spirit of my invention.

Reference is herein made to my applications, Serial Nos. 386,871, 386,872, and 387,624, as certain features therein described are shown and described and claimed in above-mentioned applications, especially the means for oscillating and controlling the oscillations of the pistons.

Having thus ascertained the nature and set forth the construction of my invention, what I claim as new, and desire to secure by Letters Patent, is—

1. A rotary engine having a rotating cylinder and pistons oscillating therein, said cylinder being formed by inner and outer rings and connecting-heads between said rings, forming thereby an annular cavity, the inner ring having a groove in which is packed a stationary abutment-disk provided with abutments extending into said cavity, substantially as set forth.

2. A rotary engine having a rotating cylinder, oscillating pistons, and an abutment-disk provided with abutments, the pistons being provided with an opening to allow them to revolve around the abutment-disk on which said pistons are packed, substantially as set forth.

3. A rotary engine having oscillating pistons, a rotating cylinder formed by inner and outer rings and heads connecting said rings, and a stationary abutment-disk, the inner ring of said cylinder having a groove in which is packed the said abutment-disk, substantially as set forth.

4. A rotary engine having a rotating cylinder, and oscillating pistons formed of disks and inner and outer wings, the outer wings connecting said disks, substantially as set forth.

5. A rotary engine having a rotating cylinder formed by inner and outer rings and connecting-heads, oscillating pistons having their shafts mounted in said heads, and piston-seats formed in the peripheries of said rings and extending from head to head, substantially as set forth.

6. A rotary engine having a rotating cylinder, an abutment-disk, and oscillating pistons formed by disks, and inner and outer wings, the inner wings having an opening to allow the piston to revolve around the abutment-disk during the oscillations of the pistons, substantially as set forth.

7. A rotary engine having oscillating pistons, a rotating cylinder formed by inner and outer rings, heads connecting said rings, said cylinder being provided with an annular groove, and a hub secured to the inner periphery of the inner ring, by means of said hub the cylinder being mounted on the driving-shaft, substantially as set forth.

8. A rotary engine having oscillating pistons, a rotating cylinder formed by an imperforate outer ring and an inner grooved ring, heads connecting said rings, and an abutment-disk having steam inlet and exhaust ports and packed steam-tight in the groove of the inner ring, substantially as set forth.

9. A rotary engine having a rotating cylinder, oscillating pistons formed by disks and inner and outer wings, and an abutment-disk, the outer wing having a groove in which is packed the outer periphery of the abutment-disk, substantially as set forth.

10. A rotary engine having oscillating pistons, a rotating cylinder formed by inner and outer rings and connecting-heads, and an abutment-disk packed in a groove in said inner ring, the outer ring having a flange and ribs for strengthening the cylinder, substantially as set forth.

11. A rotary engine having oscillating pistons, a rotating cylinder formed by inner and outer rings and connecting-heads, an abutment-disk packed in a groove in the inner ring and having its hub located within the inner periphery of the inner ring, and a hub by which the rotating cylinder is mounted upon the driving-shaft secured to and located within the inner periphery of said inner ring, substantially as set forth.

12. A rotary engine having a rotating cylinder, oscillating pistons, and an abutment-disk, said cylinder being formed by inner and outer rings and heads in which the shafts of each piston are mounted, the inner ring having a groove in which the abutment-disk is packed, substantially as set forth.

13. A rotary engine having a rotating cylinder, oscillating pistons, and an abutment-disk, said cylinder being formed by inner and outer rings and connecting-heads secured to and rotating with said rings, the inner ring having a groove in which the abutment-disk is packed, substantially as set forth.

14. A rotary engine having a rotating cylinder formed by inner and outer rings and connecting-heads, and oscillating pistons placed in seats provided for them in the said rings and heads, the inner ring having a groove in which is packed a stationary abutment-disk, substantially as set forth.

15. A rotary engine having oscillating pistons, and a rotating cylinder formed by inner and outer rings and heads connecting said rings, said cylinder being provided with an annular groove and a hub, by means of said hub the cylinder being mounted on the driving-shaft, substantially as set forth.

In testimony whereof I, SAMUEL GLENVILLE BROSIUS, have signed my name to this specification, in the presence of two subscribing witnesses, on this 30th day of April, A. D. 1891.

SAMUEL GLENVILLE BROSIUS.

Witnesses:
J. HENRY KAISER,
JOSEPH C. STACK.